(12) United States Patent
Tressol et al.

(10) Patent No.: US 12,088,070 B2
(45) Date of Patent: Sep. 10, 2024

(54) METHOD AND SYSTEM WITH TWO CURVES FOR GUIDING A CABLE TIE

(71) Applicant: Airbus Operations (S.A.S.), Toulouse (FR)

(72) Inventors: Herve Tressol, Toulouse (FR); Sébastien Forasacco, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/952,599

(22) Filed: Sep. 26, 2022

(65) Prior Publication Data
US 2023/0101231 A1     Mar. 30, 2023

(30) Foreign Application Priority Data
Sep. 29, 2021   (FR) ...................................... 2110279

(51) Int. Cl.
    *H02G 1/06*          (2006.01)
    *F16L 3/233*        (2006.01)
    *H02G 3/30*          (2006.01)

(52) U.S. Cl.
    CPC ................ *H02G 1/06* (2013.01); *F16L 3/233* (2013.01); *H02G 3/30* (2013.01)

(58) Field of Classification Search
    CPC . F16L 3/243; F16L 3/233; H02G 3/26; H02G 3/32; H02G 1/06; H02G 3/30
    USPC ....................................................... 248/74.1
    See application file for complete search history.

(56) References Cited

U.S. PATENT DOCUMENTS

| | | | | |
|---|---|---|---|---|
| 3,130,948 A | * | 4/1964 | Bedford, Jr. .............. | F16L 3/24 248/58 |
| 4,407,478 A | * | 10/1983 | Hodges ................... | F16L 3/133 248/62 |
| 5,399,814 A | * | 3/1995 | Staber .................. | H02G 3/0456 174/136 |

(Continued)

FOREIGN PATENT DOCUMENTS

| | | | | |
|---|---|---|---|---|
| CN | 113964733 A | * | 1/2022 | ............... H02G 1/06 |
| DE | 0257367 A1 | * | 3/1988 | ............... F16L 3/12 |

(Continued)

OTHER PUBLICATIONS

French Search Report for Application No. 2110279 dated May 23, 2022.

*Primary Examiner* — Taylor Morris
(74) *Attorney, Agent, or Firm* — KDW Firm PLLC (57) ABSTRACT

A guide system to enable installation of a cable tie on a supporting element by passing the cable tie through a first passage to traverse the supporting element, then through a second passage to come back to the same side of the supporting element, enabling the cable tie to surround one or more cables. The guide device includes a gutter with a guide surface with two curves, a first longitudinal curve enabling the surface to extend from a passage to the other passage and a second transverse curve forming a partial envelope for receiving the cable tie and guiding and holding the cable tie in the gutter. The device also has at least one protrusion with a wedging surface projecting from the surface of the gutter to come into contact with and wedge against the supporting element to lock the gutter in position in relation to the supporting element.

6 Claims, 13 Drawing Sheets

(56) References Cited

U.S. PATENT DOCUMENTS

| | | | | |
|---|---|---|---|---|
| 6,378,811 | B1* | 4/2002 | Potter | H02G 3/30 |
| | | | | 248/65 |
| 6,916,014 | B1* | 7/2005 | Thomas | H02G 1/08 |
| | | | | 254/134.3 R |
| 7,261,256 | B2* | 8/2007 | Pattie | F24F 13/0254 |
| | | | | 244/129.1 |
| 7,407,138 | B1* | 8/2008 | Gretz | F16L 3/233 |
| | | | | 248/68.1 |
| 7,429,020 | B2* | 9/2008 | Huebner | F16L 3/14 |
| | | | | 248/58 |
| 7,505,665 | B2* | 3/2009 | Lohr | B64D 47/00 |
| | | | | 385/136 |
| 7,784,743 | B2* | 8/2010 | Zeuner | F16L 3/123 |
| | | | | 248/63 |
| 8,025,258 | B2* | 9/2011 | Eldridge | H02G 3/24 |
| | | | | 248/65 |
| 8,141,825 | B2* | 3/2012 | Logan | H02G 3/30 |
| | | | | 248/74.1 |
| 8,833,706 | B2* | 9/2014 | Elsmore | F16L 3/1075 |
| | | | | 248/62 |
| 9,009,923 | B2* | 4/2015 | Rouleau | H02G 3/30 |
| | | | | 24/16 PB |
| 9,296,059 | B2* | 3/2016 | Hobson | B23K 9/202 |
| 9,309,719 | B2* | 4/2016 | Sylvester | H02G 3/30 |
| 9,512,940 | B2* | 12/2016 | Blakeley | H02G 3/32 |
| 9,587,433 | B2* | 3/2017 | Sylvester | F16M 13/022 |
| 9,748,749 | B2* | 8/2017 | Eyles | H02G 3/0406 |
| 10,941,882 | B1* | 3/2021 | Rhysing | F16L 3/1091 |
| 2002/0088637 | A1* | 7/2002 | Benito-Navazo | H02G 3/30 |
| | | | | 174/651 |
| 2009/0045301 | A1* | 2/2009 | Collins | F16L 3/245 |
| | | | | 248/65 |
| 2010/0294896 | A1* | 11/2010 | Sayilgan | F16L 3/233 |
| | | | | 248/224.8 |
| 2012/0080566 | A1 | 4/2012 | Pauchet et al. | |
| 2013/0313375 | A1* | 11/2013 | Dworak, Jr. | F16L 3/1083 |
| | | | | 248/74.1 |
| 2016/0121822 | A1* | 5/2016 | Shaw | B60R 16/0215 |
| | | | | 248/74.3 |
| 2017/0292634 | A1 | 10/2017 | Nguyen | |
| 2018/0233263 | A1* | 8/2018 | Mizutani | H01F 17/06 |
| 2019/0162331 | A1* | 5/2019 | Wagner | F16L 3/26 |
| 2021/0384716 | A1* | 12/2021 | Rhysing | G06F 3/14 |
| 2022/0373007 | A1* | 11/2022 | Heineke | F16L 3/233 |

FOREIGN PATENT DOCUMENTS

| | | | | |
|---|---|---|---|---|
| DE | 3822752 | A1 * | 1/1990 | F16L 3/233 |
| DE | 0355278 | A2 * | 2/1990 | E02F 5/102 |
| DE | 19500161 | C2 * | 12/1996 | F16L 3/233 |
| DE | 102015210565 | A1 * | 12/2016 | F16L 3/00 |
| DE | 202016106894 | U1 * | 3/2017 | B60R 16/0215 |
| EP | 3 808 996 | A1 | 4/2021 | |
| FR | 2 965 670 | A1 | 4/2012 | |
| GB | 2 123 619 | A | 2/1984 | |
| GB | 2285282 | A * | 7/1995 | F16L 3/233 |
| GB | 2 564 883 | A | 1/2019 | |
| JP | 2020520628 | A * | 7/2020 | H02G 1/06 |
| NL | 0722062 | A1 * | 7/1996 | F16L 3/233 |
| WO | WO-2017041859 | A1 * | 3/2017 | E02F 5/101 |
| WO | WO-2020146531 | A1 * | 7/2020 | F16L 3/137 |

* cited by examiner

Fig. 1

PRIOR ART

METHOD AND SYSTEM WITH TWO CURVES FOR GUIDING A CABLE TIE

TECHNICAL FIELD

The disclosure herein relates to the installation of a cable tie for holding cables, and specifically electrical cables, in position in relation to a given structure. More specifically, the invention proposes a method and a guide device of the cable tie to facilitate installation thereof.

BACKGROUND

Figure 1:
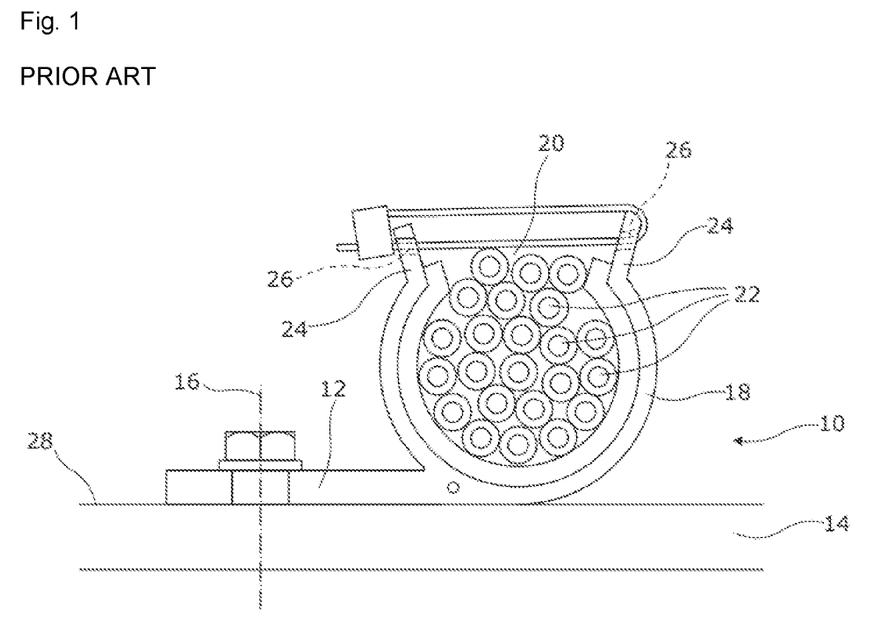
FIG. 1 is a simplified schematic side cross-section view of a cable fastening device according to the prior art.

In an aircraft, numerous electrical cables run inside the structure of the aircraft, often in bundles, and have to be held using fastening devices such as cable ties, which are in turn fastened to equipment of the aircraft or to the actual structure of the aircraft, such as frames of the fuselage. The cable ties are intended to hold the cables in relation to this equipment or these structural elements. French patent FR2965670, filed by Airbus Operations SAS, discloses such a fastening device. According to FIG. 1, which reproduces FIG. 1 from this patent with minor modifications, which are intended to improve the clarity of the description provided below, the fastening device has a first portion 12 pressed against a supporting element 14 using linkage 16 and a second C-shaped portion 18 with an opening 20 enabling insertion of the cables 22. The ends of the branches of the C have legs 24 with slots 26. The cables are inserted into the C shape and held using a cable grip that passes through the two slots and pushes the two legs 24 together such as to clamp the cables 22.

Figure 2:
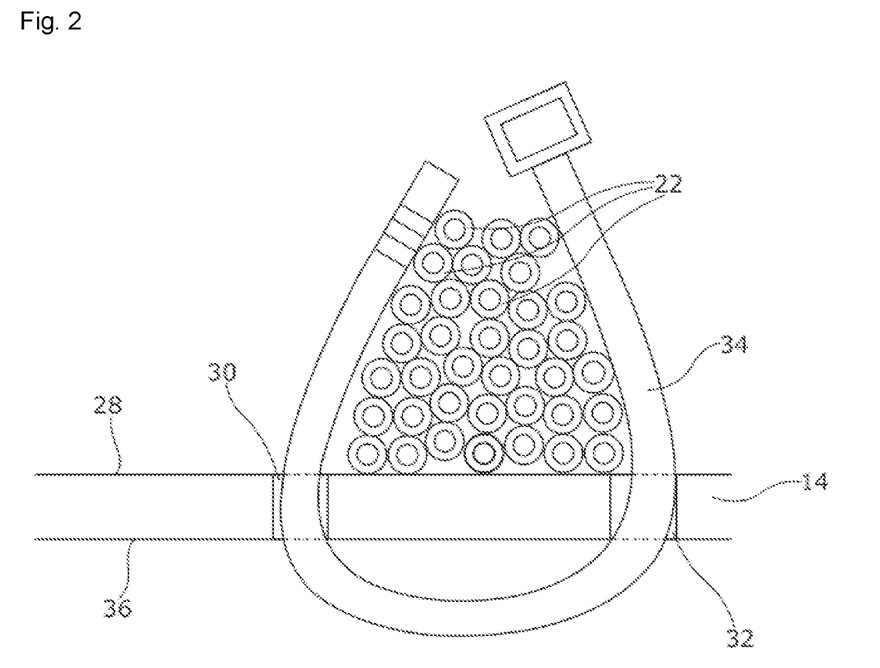
FIG. 2 is a simplified schematic lateral cross-section view of a cable fastening device according to the prior art that is different from the device shown in FIG. 1.

To minimize the volume of electrical installations, as shown in FIG. 2, it is beneficial to keep the cables 22 as close as possible to the supporting element 14, and in particular against one of the faces 28 thereof, referred to as the front face. One solution involves perforating the supporting element 14 with two orifices 30, 32 on each side of the cables 22 and holding the cables with a cable tie 34, referred to here as a cable grip, passing through the two orifices to surround and fasten the cable or cables against the front surface 28 of the supporting element. In this case, the cable tie passes through one of the orifices, referred to as the first orifice 30, on the other side of the supporting element, from the side of the rear face 36 and passes back from the side of the front face 28 through the other orifice, referred to as the second orifice 32. The cable tie 34, which is for example self-locking, is then closed to hold the cable or cables against the front face. However, when implementing this solution, it may not be possible to access the rear face 36 of the supporting element, thereby preventing the cable tie 34 from passing back through the second orifice 32, or making such an operation very complicated.

SUMMARY

The disclosure herein is intended to propose a guide device for a cable tie enabling the cable tie to be passed back without having access to the rear of the supporting element, and the ability to implement the described solution regardless of environment.

For this purpose, the disclosure herein relates to a guide system for a cable tie including a guide device for the cable tie and a supporting element to which the device is applied, the guide device being designed to hold at least one cable on a front face of the supporting element that is oriented towards the cable or cables, the opposite face of the supporting element being referred to as the rear face, the cable tie being designed to traverse the supporting element from the front face to the rear face through a first passage, then again from the rear face to the front face through a second passage to surround the cable or cables, in which the two passages can be separate or a single passage, the guide device comprising a gutter with a guide surface with two curves, a first longitudinal curve enabling the surface to extend from one of the passages to the other passage and a second transverse curve forming a partial envelope for receiving the cable tie and guiding and holding the cable tie in the gutter, the device also having at least one protrusion with a wedging surface projecting from the surface of the gutter that is designed to come into contact with and wedge against the supporting element to lock the gutter in position in relation to the supporting element.

The device guides the cable tie along the gutter during installation from the first orifice to reach and traverse the second orifice, so as to return to the front face of the supporting element and enable closure thereof. The first curve enables the device to extend between the two orifices to guide the cable tie from one orifice to the other orifice, and the second curve prevents the cable tie from coming out of the gutter when moving towards the second orifice.

The disclosure herein incorporates at least one of the following optional features, taken individually or in combination.

The gutter is enveloping, the side walls extending such that, when the device is positioned against the rear face of the supporting element, the free ends of the side walls of the gutter come into contact with the rear face of the supporting element to form a cover.

Where the two passages form a single passage, the side walls of the gutter have a portion where the walls meet transversely to form a bridge.

The bridge projects from the plane X,Y of the wedging surface or surfaces of at least one protrusion such that, when the device is installed against the rear face of the supporting element, the bridge is inserted into the passage to project beyond the front face thereof.

The bridge has a surface forming a longitudinal cavity, the bottom of which is designed to receive the cable or cables transversely, and the free longitudinal ends of which are designed to bear the cable tie such that the cable tie passes above the cable or cables.

The longitudinal free ends of the cavity have a transverse hollow shape.

The guide system has two protrusions arranged at the two longitudinal ends of the gutter.

The gutter has side walls of equal and identical height over at least one portion of the length of the gutter and a single wedging surface.

The gutter has a straight elongate portion designed to protrude on both sides of the supporting element once the device has been installed on the supporting element, the wedging surface being on the side of the front face of the supporting element when the device is in use.

The disclosure herein also relates to a guide method for a cable tie that involves using the guide system having one or more of the aforementioned features and including the following steps: positioning the wedging surface or surfaces against one of the faces of the supporting element, and guiding the cable tie along the inner surface of the gutter of the guide device, the longitudinal curve enabling the cable tie to traverse the two passages successively and the transverse curve enabling the cable tie to be held transversely inside the gutter while moving.

The disclosure herein includes at least one of the following optional features, taken individually or in combination.

The method includes a step of removing the gutter once the cable tie has traversed the second passage.

The method includes a step of fastening the wedging surface or surfaces to the supporting element.

BRIEF DESCRIPTION OF DRAWINGS

Other features and advantages are set out in the description of the disclosure herein below, given purely by way of example and with reference to the attached drawings, in which.

DETAILED DESCRIPTION

Figure 3:
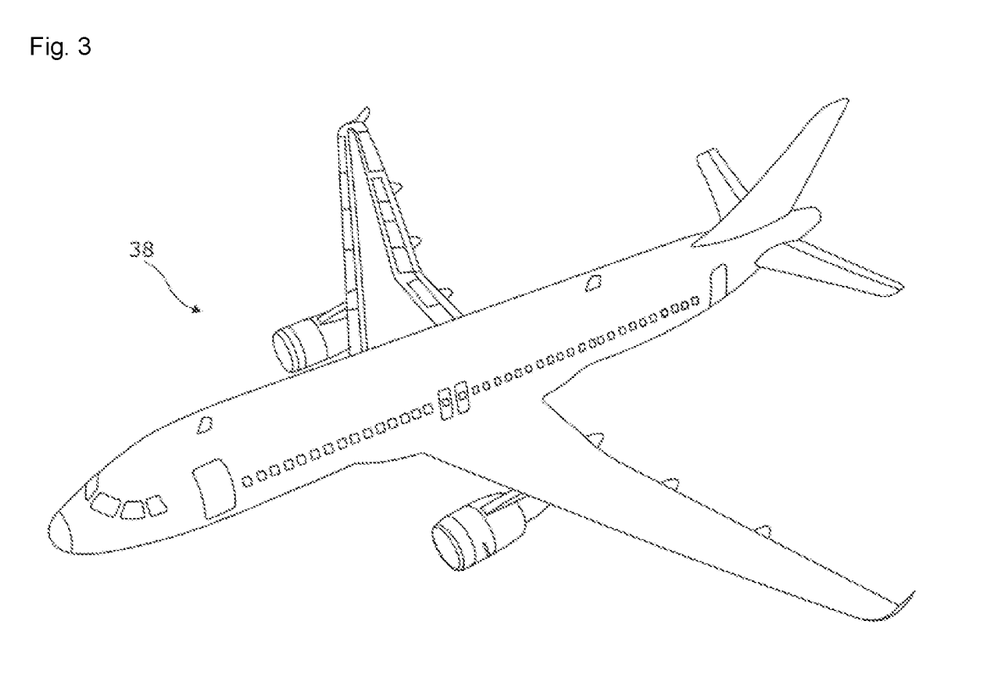
FIG. 3 is a perspective view of an aircraft in which a fastening device according to the disclosure herein can be used.
Figure 4:
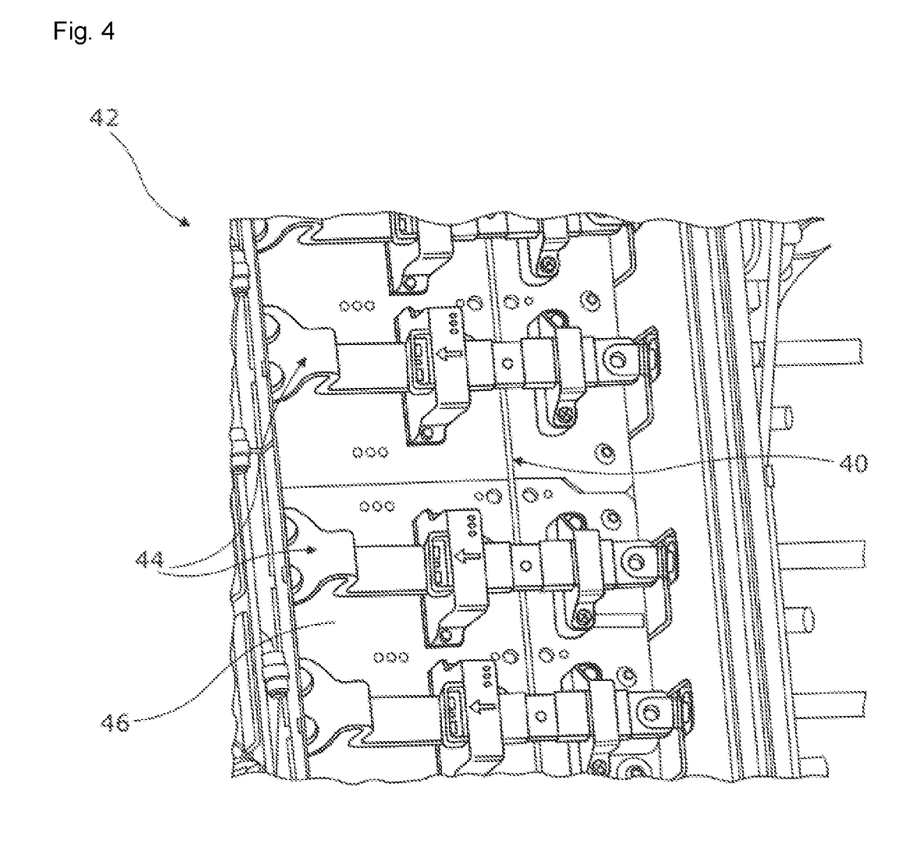
FIG. 4 is a schematic perspective view of equipment in which a fastening device according to the disclosure herein can be used.

As shown in FIGS. 3 and 4, in an aircraft 38 and in a vehicle such as a train, a ship or the like, a building, equipment or any other environment in which one or more cables 40 are laid, the cables must be held in position. In the example of electrical equipment 42 in an aircraft 38, the cables 40 are routed in bundles. The cables may be close to sets 44 of bus bars, but should preferably not be too close. The cables 40 or sometimes install at the bottom 46 of boxes with no rear access. This is one of many examples in which the rear of the supporting element as described at the beginning of the present description, in this case the box, is very difficult or impossible to access without a lengthy and complex disassembly operation.

As shown in FIGS. 5 through 21, the subject matter herein discloses a guide device 48 for a cable tie 50 that is designed to hold at least one cable 40 on a front face 54 of a supporting element 56, surrounding the cable or cables. In the illustrated implementation, just one cable is shown for the sake of simplicity. The guide system 51 (reference sign shown in FIGS. 6, 9 and 11) refers to the device 48 and to the supporting element 56 to which the device is applied. The cable tie 50 traverses the supporting element 56 from the front face 54 to the rear face 58 through a first through-passage 60, then again from the rear face 58 to the front face 54 through a second through-passage 62 to surround the cable or cables 40. The guide device 48 has an elongate gutter 64, the longitudinal direction being the lengthwise direction of the gutter. The longitudinal direction is approximately the direction adopted by the cable tie 50 once positioned in the gutter. Transverse direction means a direction perpendicular to the longitudinal direction. The transverse direction is approximately the direction of the cable or cables 40 held by the cable tie 50. These directions are indicating using the reference frame in FIG. 5: the axis X represents the longitudinal direction, the axis Y represents the transverse direction, and the axis Z represents the height or the direction perpendicular to the plane X,Y, which in the illustrated example is a plane parallel to the supporting element 56 and more specifically to the front surface 54 and rear surface 58 thereof. In the supporting element, the passages 60 and 62 are on each side in a longitudinal plane of the cable or cables 40. The front face 54 is the face oriented towards the cable or cables 40. The rear face 58 is the face of the supporting element opposite the front face 54 in the direction Z.

The gutter 64 has at least one portion 67 with a longitudinal and transverse internal guide surface 66, the longitudinal guide being provided by a longitudinal shape enabling the gutter to turn back on itself longitudinally to enable the gutter to run from one passage 60 to the other passage 62 of the supporting element, and the transverse guide being provided by a hollow transverse section forming a transverse guide cavity. In the illustrated implementation, the surface 66 has at least one portion forming a curve in a longitudinal plane X-Z (represented by a double arrow L in FIG. 6). In a transverse plane Y-Z, the gutter 64 has at least one portion with a U-shaped section (represented by a double arrow I in FIG. 6). The U shape forms a partial hollow envelope. The cable tie 50 is guided when moving at the bottom of this envelope to receive the cable tie 50 and to guide and hold the cable tie in the gutter 64. The term "inner" in the expression "inner surface of the gutter" refers to the surface on which the cable tie 50 is guided. Each side 67A, 67B, 67C of the portion 67 is a flat surface. The sides 67A and 67B as well as 67B and 67C are linked by curves and not angles. Any other shape maybe used for the surface 66, such as a V shape, for example to provide a guide cavity. In another example, the U-shaped section can also be formed of sides with curved surfaces instead of flat surfaces.

The guide device 48 also has at least one wedging surface 68, 70 projecting from the outer surface 72 of the gutter, that is shaped to come into contact with and wedge against the supporting element 56, and more specifically the surface 54 or 58 thereof, depending on the embodiment. The word "outer" in the expression "outer surface" refers to the surface opposite the inner surface 66. According to a possible implementation, the wedging surface 68, 70 is one of the surfaces of a protrusion 84, 85 attached to or integral with the gutter. In the illustrated implementation, the surface 68, 70 is flat such as to mate with a flat surface (54 or 58) of the supporting element 56 and to prevent the guide device from moving, as shown in FIGS. 6, 11, 12 and 21.

Once the cable tie 50 has been installed, the cable or cables 40 are surrounded by the cable tie 50, which is deformed by tightening to reduce the passage window for the cable or cables 40. According to one implementation, the material of the cable tie 50 is elastic such as to return to an initial shape when the cable tie 50 is loosened. According to another implementation, the material is not elastic but only deformable, for example if the cable tie 50 is a single-use cable tie. In a known manner, a cable tie 50, also referred to as a tie wrap, has a flat elongate body 74 with a plurality of notches 76 on least one face that are arranged in a direction perpendicular to the longitudinal direction of the body, and a head 78, shown only in FIG. 12 for the sake of simplicity, located at a first end 80 of the body 74, that has an orifice 82 in the form of a slot with a lug designed to cooperate with one of the notches 76 of the body 74 such as to immobilize the body 74 in relation to the head 78. Other implementations are possible in which a portion of the body is a rack gear designed to be locked by an appropriate system provided in the head. The device in the illustrated implementation is a Serflex clamping device 50 (registered trademark). The cable tie 50 is self-locking, i.e. once the body has been pulled, the cable tie remains locked in position or in a nearby position.

The surface condition of the inner surface 66 of the gutter is preferably free of friction elements. In the illustrated implementation, the surface 66 is smooth. The surface may also be made of a material providing such a surface condition or have a coating providing such a surface condition. The width of the side 67B is determined to ensure satisfactory guidance of the cable or cables.

According to a first implementation shown in FIGS. 6 to 9 and 12 to 15, the guide device 48 is fastened to the supporting element 56 and remains in position during use, for example on account of being inaccessible once the supporting element has been assembled. In the illustrated implementation, the gutter 64 is enveloping, the side walls 88, 90 of the gutter 64 extending such that when the device is positioned against the rear face 58 of the supporting element, the free ends 92, 94 of the walls 88, 90 come into contact with the rear face 58 of the supporting element to form a closed cover with the surface of the rear face 58 of the supporting element. In the illustrated example, the entirety of the free end 92, 94 of the gutter 64 is contained within a plane. Therefore, when applied to the supporting element, the device 48 forming a cover with the supporting element leaves no passage to the outside of the gutter, since all of the covering walls are unbroken. In the illustrated implementation, the gutter has a semi-cylindrical shape. In a possible example, the section in a central plane of symmetry of the gutter (parallel to the plane X,Z) parallel to the side walls 88, 90 thereof is semi-circular and in a plane perpendicular thereto, a plane parallel to the plane X,Y of rectangular section.

According to the embodiments illustrated in FIGS. 5 through 9, the device 48 has two wedging surfaces 68, 70 positioned at the two longitudinally opposite free ends of the gutter. In the illustrated example, the two protrusions 84, 85 form semi-cylindrical lugs. The wedging surfaces are in the same plane X,Y. In the illustrated implementation, each protrusion 84, 85 is perforated by a through-orifice 96, 98 enabling the passage of a fastening system, such as a nut/bolt system, for fastening to the supporting element. Any other system can be used, such as a rivet system.

Figure 8:
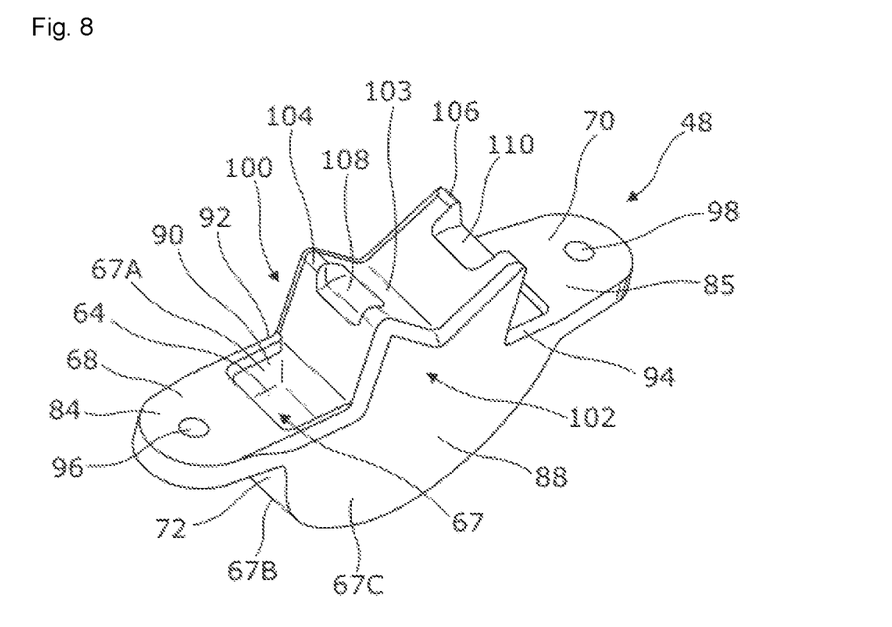
FIG. 8 is a schematic perspective view of a guide device according to a second embodiment of a first implementation.
Figure 9:
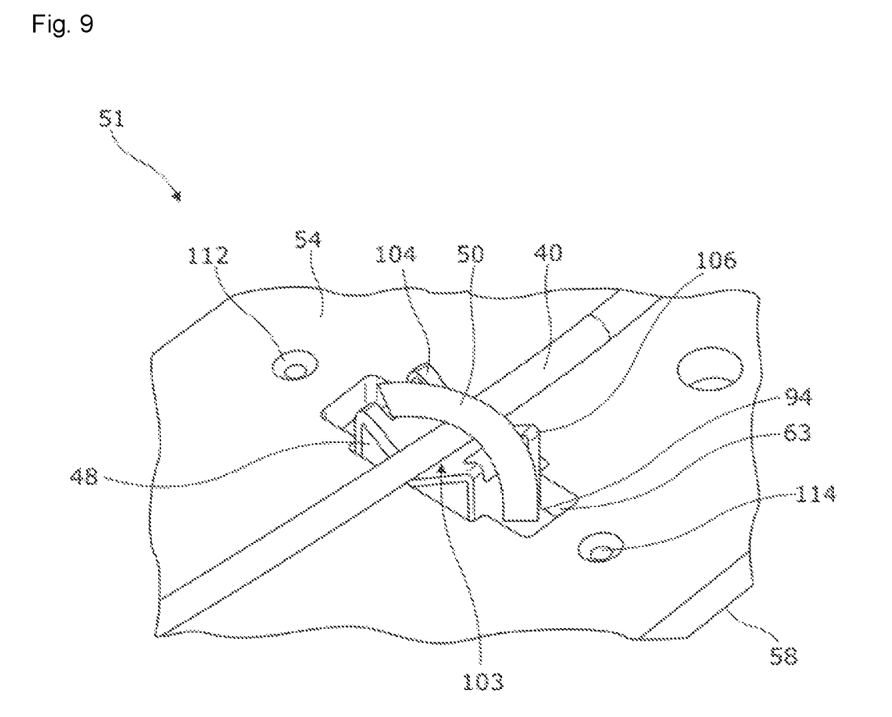
FIG. 9 is a partial schematic perspective top view of a supporting element associated with the device in FIG. 8.

In a specific embodiment, referred to as the second embodiment, of the first implementation, as illustrated in FIGS. 8 and 9, the side walls 88, 90 of the gutter have a portion 100 where the walls 88, 90 meet transversely to form a bridge 102 between the side walls, thereby providing a supporting element for the cable or cables where the two passages 60, 62 of the supporting element form a single passage 63 (shown in FIG. 9). The bridge 102 projects from the plane X,Y of the surfaces of the protrusions designed to come into contact with the rear face 58 of the supporting element such that, when the device 48 is installed against the face 58 of the supporting element, the bridge 102 is inserted into the passage 63 to project beyond the front face 54 thereof. The bridge 102 has a surface forming a cavity 103, the bottom of which is designed to receive the cable or cables 40 transversely, and the free longitudinal ends 104, 106 of which bear the cable tie 50 such that the cable tie passes above the cable or cables. The height of the bridge 102 can be determined to ensure a given distance to the supporting element, for example to move the cable or cables away from the supporting element. According to the illustrated example, the bridge 102 has a V-shaped longitudinal section. The cables are then contained in the V-shaped section and the free ends of the V bear the cable tie 50. In the illustrated implementation, the free ends 104, 106 have a transverse hollow shape 108, 110 to hold the cable tie at the bottom of the hollow. In the illustrated example, the bottom of the hollow portion 108, 110 is flat to better hold a flat cable tie.

Figure 10:
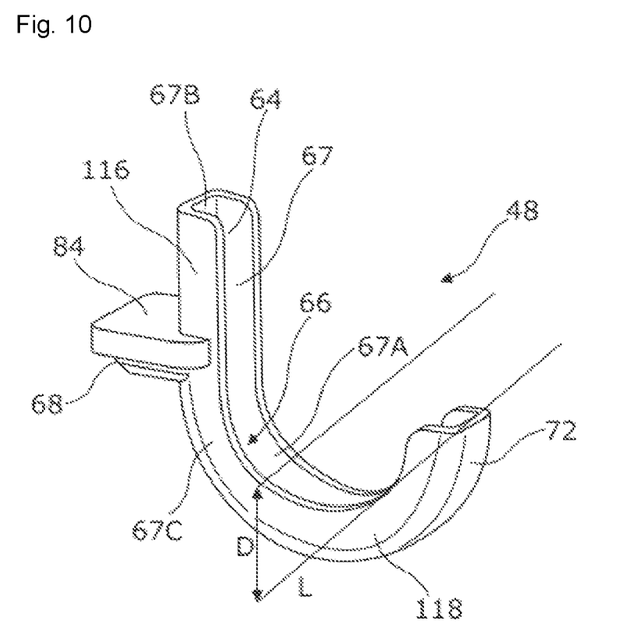
FIG. 10 is a schematic perspective view of a guide device according to a second implementation.
Figure 11:
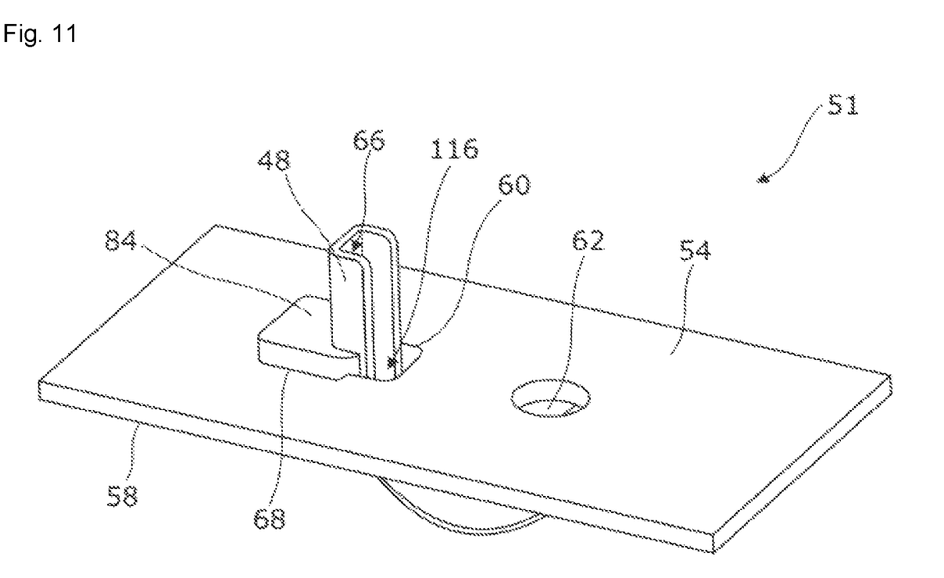
FIG. 11 is a schematic perspective top view of a supporting element associated with the device in FIG. 10.
Figure 18:
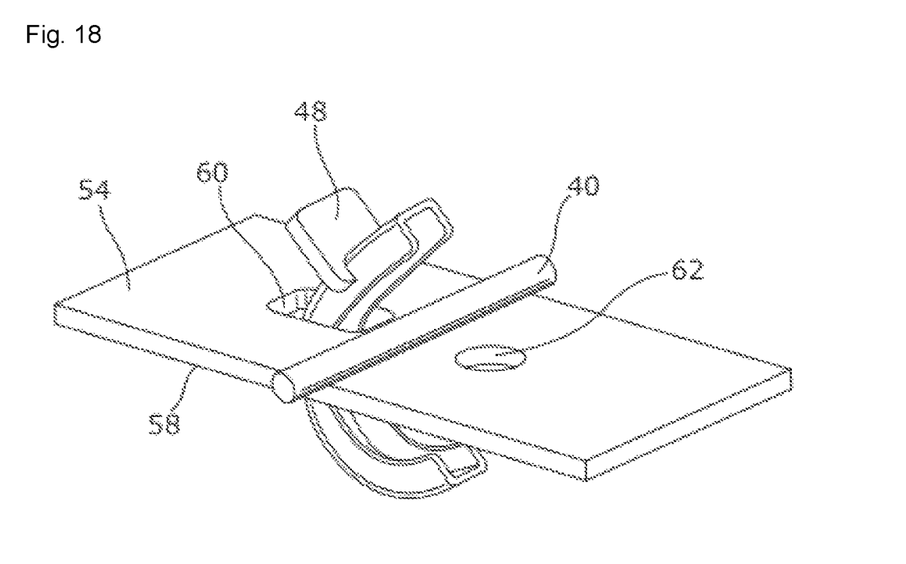
FIG. 18 is a perspective view identical to the view in FIG. 16 showing a usage step of the device that follows the step shown in FIG. 17.

According to a second implementation illustrated in FIGS. 10 and 11, the guide device 48 is not fastened to the supporting element, but installed temporarily to enable the cable tie to be guided through the two passages 60, 62 before being removed. The device is therefore not fastened to the supporting element and is only used to enable installation of the cable tie 50. In the illustrated implementation, the device has just one protrusion 84. The gutter 64 has at least one straight elongate portion 116 extending in the longitudinal direction to enable the gutter to traverse the supporting element through at least one passage 60 and, once wedged, to project beyond the supporting element on each side of the passage perpendicular to the plane of the supporting element. The portion 116 can be curved, but the fact of being straight and perpendicular to the plane X-Y once the device has been installed and wedged facilitates the handling thereof. In this embodiment, the wedging surface 68 of the protrusion 84 is on the side of the front face 54 of the supporting element 56 once the device 48 is in position. In this embodiment, the gutter 64 then has a longitudinal straight portion 116 and a curved portion 118 providing guidance through the passages. In addition to having at least the dimensions specified above, the passage 60 must be larger than the greatest distance D between the transverse line L of the curve of the gutter at the furthest point in the direction Z once installed on the supporting element and the plane parallel to the plane of the protrusion (parallel to the plane X,Y) at the free end of the gutter on the side of the curved portion 118. As shown in FIG. 18, this enables the gutter to be inserted through the passage 60. In this implementation, the height of the sides 67A and 67C is identical and equal over approximately the entire length of the gutter. In a specific embodiment, the cross section of the gutter 64 is smaller than the passage 62 such that at least a portion of the gutter can partially enter the passage, or otherwise.

Figure 5:
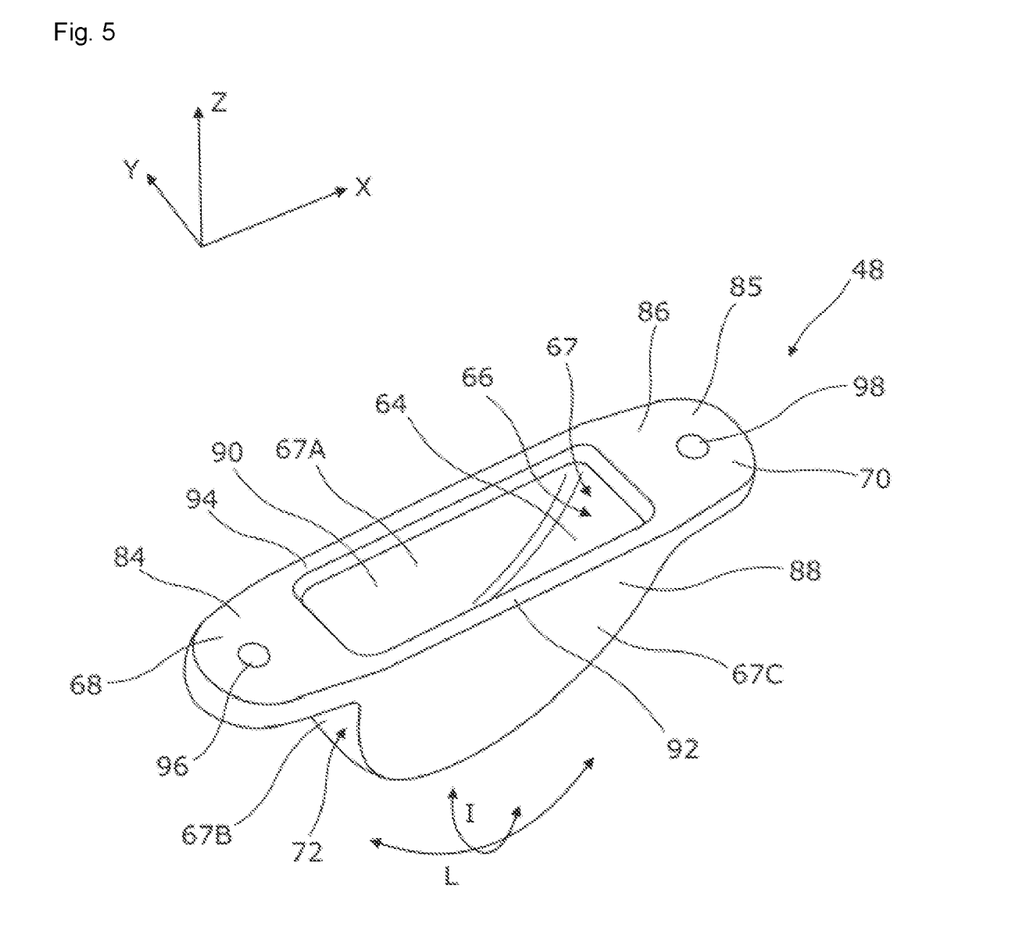
FIG. 5 is a schematic perspective view of a guide device according to a first embodiment of a first implementation.
Figure 6:
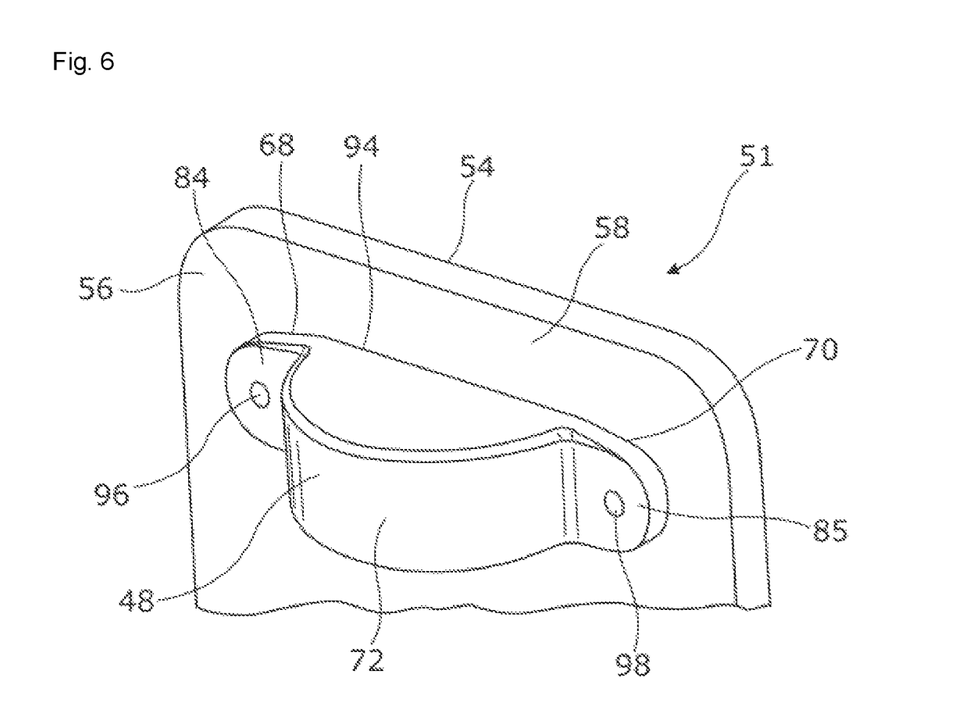
FIG. 6 is a partial schematic perspective bottom view of a supporting element associated with the device in FIG. 5 to enable a cable tie to traverse two passages in the supporting element to surround a cable.
Figure 7:
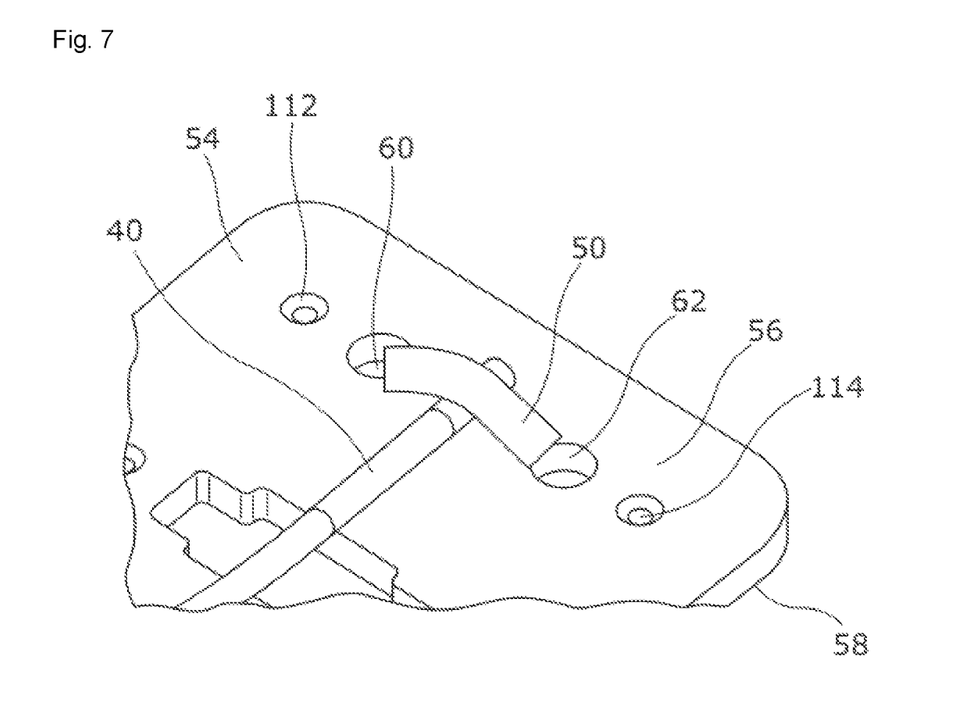
FIG. 7 is a partial schematic perspective top view of the supporting element in FIG. 6 associated with the device in FIG. 5.
Figure 12:
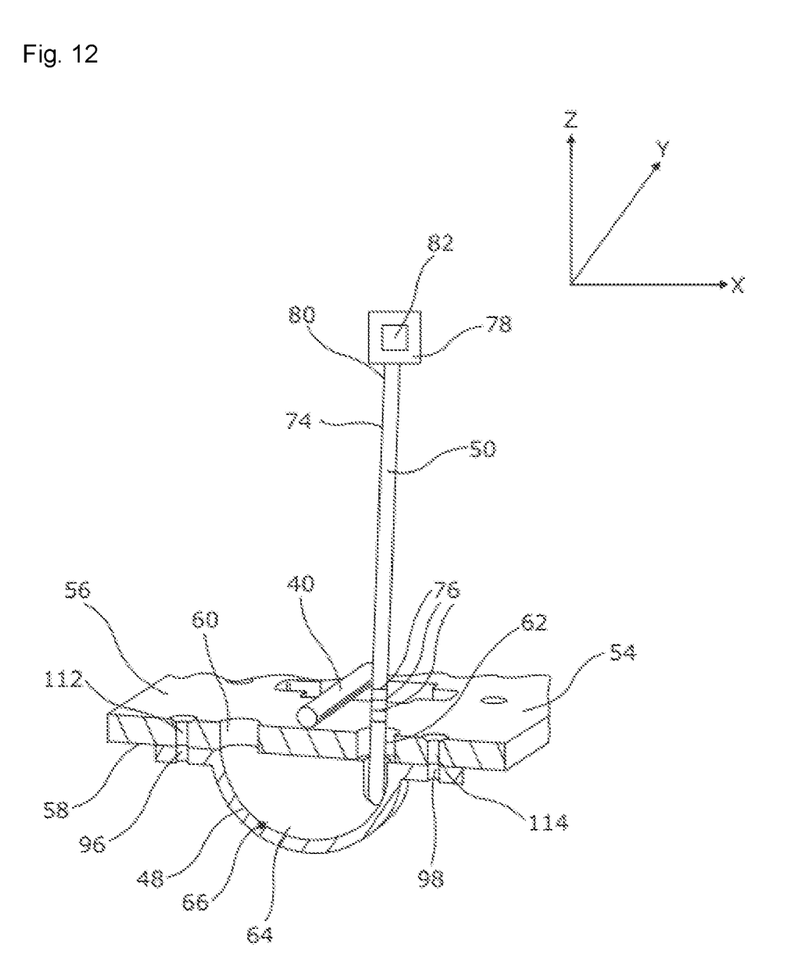
FIG. 12 is a partial schematic perspective cross-section view taken along a plane parallel to the plane X-Z in a side view of a supporting element associated with the device in FIGS. 5 to 7 representing a usage step of the device.
Figure 13:
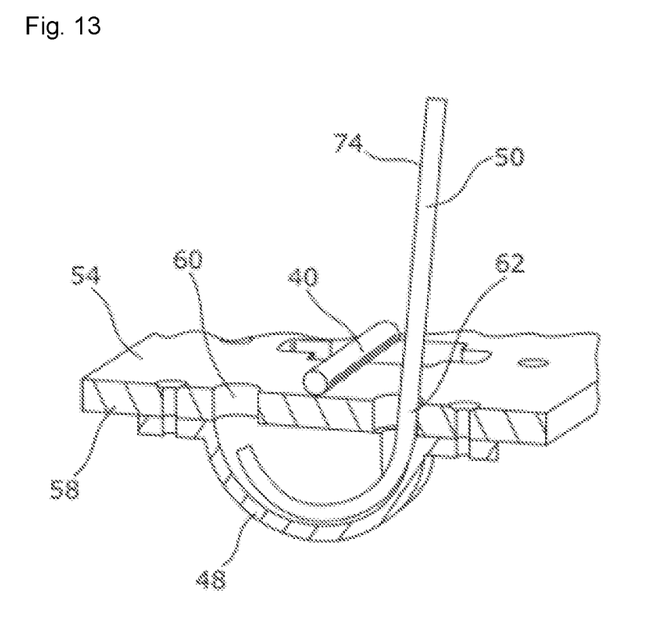
FIG. 13 is a view identical to the view in FIG. 12 showing a usage step of the device that follows the step shown in FIG. 12.
Figure 14:
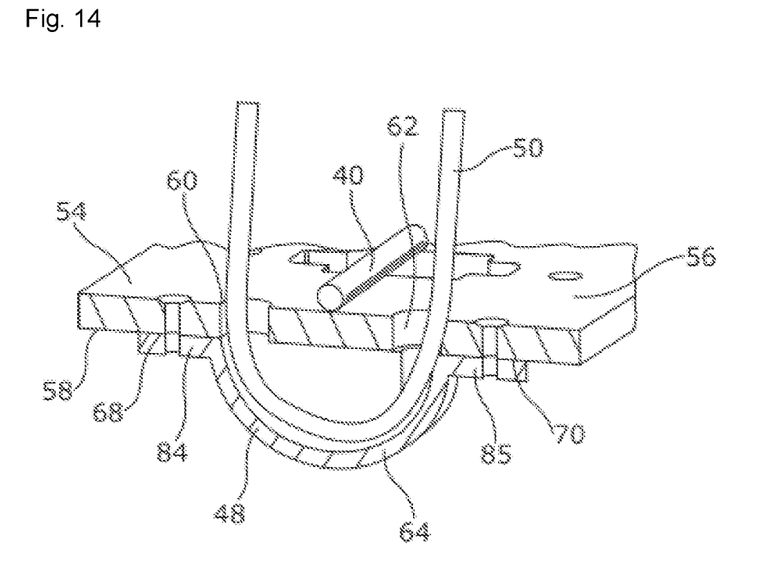
FIG. 14 is a view identical to the view in FIG. 12 showing a usage step of the device that follows the step shown in FIG. 13.
Figure 15:
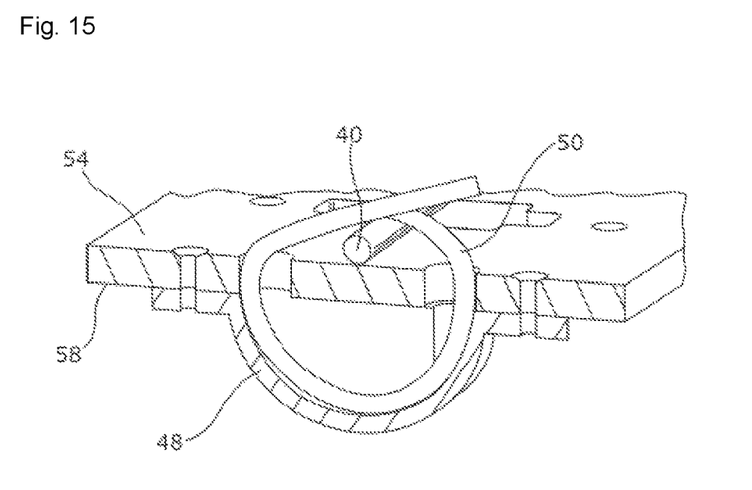
FIG. 15 is a view identical to the view in FIG. 12 showing a usage step of the device that follows the step shown in FIG. 14.
Figure 16:
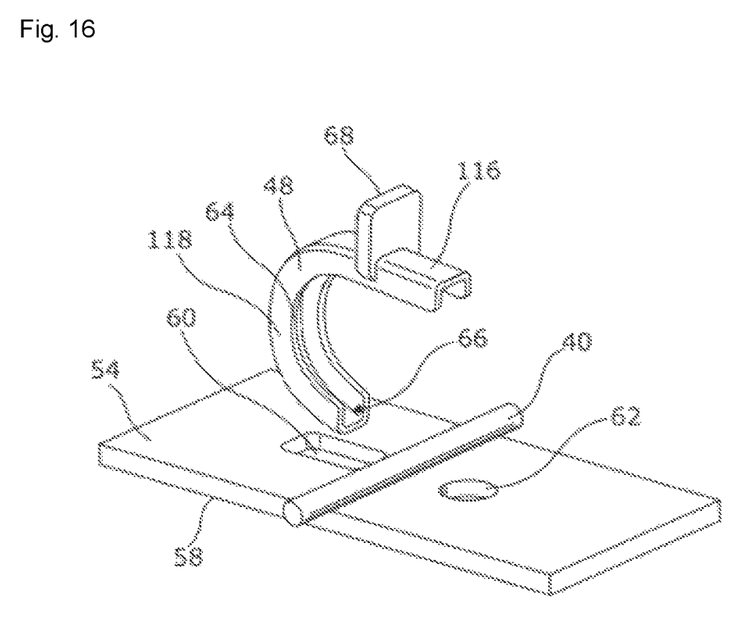
FIG. 16 is a schematic perspective view from a specific top-view angle of a supporting element associated with the device in FIGS. 10 and 11 representing a usage step of the device.

In the embodiments illustrated in FIGS. 5 through 7, the installation method for the cable tie includes the following steps, as shown in FIGS. 12 through 15. The first step shown in FIG. 12 involves fastening the device 48 to the rear face 58 of the supporting element. In the illustrated example, through-holes 112, 114 are provided in the supporting element 56 positioned such that, when the device 48 is pressed against the supporting element 56, the holes 112, 114 and the orifices 96, 98 are aligned. Screws (not shown) can then be inserted into the orifices 96, 98 and the corresponding holes 112, 114 to fasten the device 48 against the supporting element 56. Any other fastening system can be used, such as rivets. The supporting element 56 can then be installed in an environment such as a fuselage. As mentioned before, in some cases, the rear face 58 of the supporting element is no longer accessible. As shown in FIG. 12, a cable 40 is drawn and then a cable tie 50 need only be inserted in a passage 62 of the supporting element. As shown in FIG. 13, the gutter 64 of the device guides the cable tie 50 to the second passage 60, which enables the cable tie to pass back through the supporting element (see FIG. 14) to surround the cable 40. The cable tie (FIG. 15) is then closed using any means, such as those mentioned above.

Figure 17:
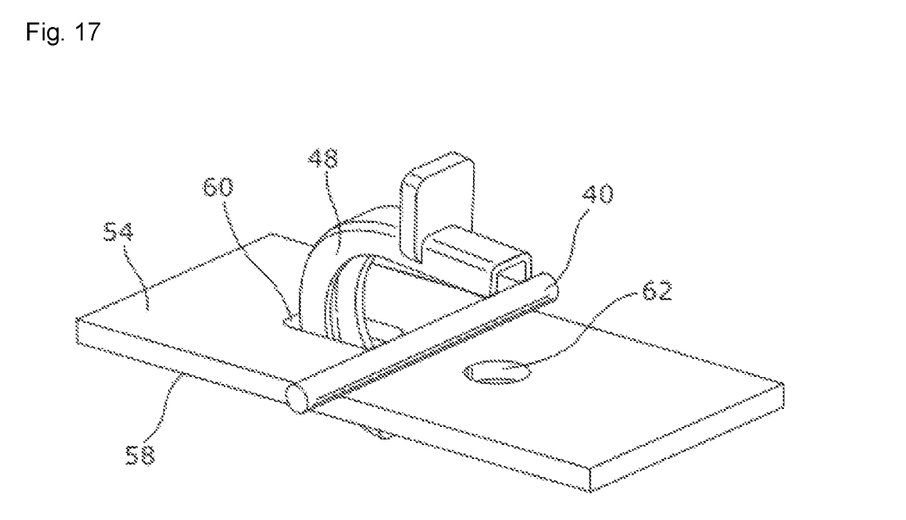
FIG. 17 is a perspective view identical to the view in FIG. 16 showing a usage step of the device that follows the step shown in FIG. 16.
Figure 19:
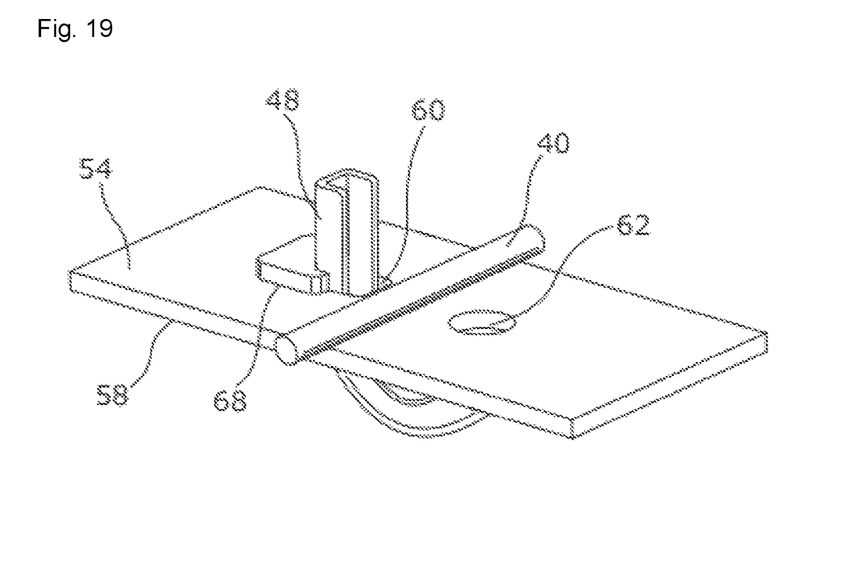
FIG. 19 is a perspective view identical to the view in FIG. 16 showing a usage step of the device that follows the step shown in FIG. 18.
Figure 20:
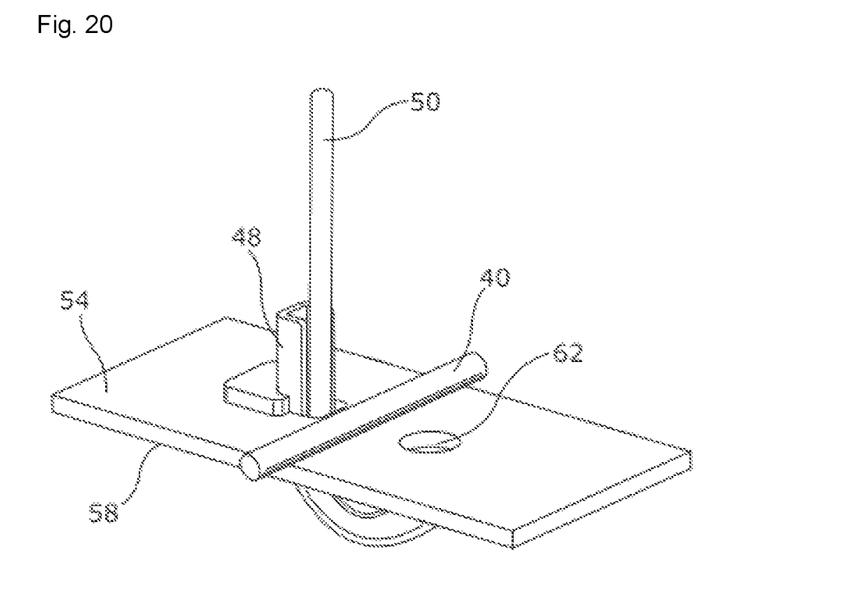
FIG. 20 is a perspective view identical to the view in FIG. 16 showing a usage step of the device that follows the step shown in FIG. 19.
Figure 21:
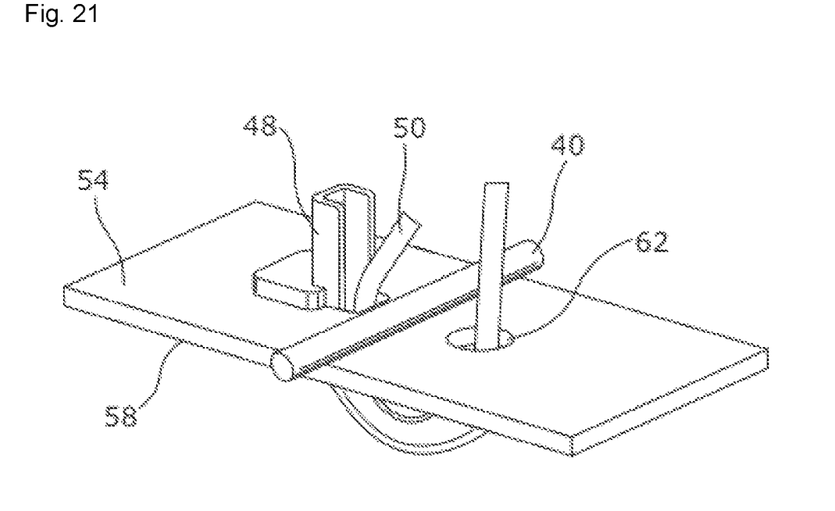
FIG. 21 is a perspective view identical to the view in FIG. 16 showing a usage step of the device that follows the step shown in FIG. 20.

FIGS. 16 through 21 show different usage steps of the device 48 according to the implementation in FIGS. 10 and 11. Unlike in the previous embodiment, the supporting element 56 can be installed in the related usage environment without having to pre-install the device 48. In a first step (FIG. 16), the device 48 is positioned in relation to the supporting element 56 such that the straight portion 116 of the gutter is approximately parallel to the plane of the supporting element 56. Given the size of the passage 60, the curved portion 118 of the gutter can then be inserted through the passage 60, as shown in FIG. 17. Once the curved portion is on the side of the rear face 58 of the supporting element 56, the operator can straighten the device 48 (FIG. 18) until the straight portion 116 is approximately perpendicular to the plane of the supporting element 56 (FIG. 19). The wedging surface 68 bears against the front face 54 of the supporting element. Once the device is wedged, the gutter links the two passages 60 and 62. The cable tie 50 is then inserted into the passage 60 (FIG. 20). The gutter guides the cable tie to the passage 62 to enable the cable tie to traverse the supporting element 56 and to surround the cable 40 (FIG. 21). Once the cable tie is tightened about the cable, the device 48 can be removed. Only the cable tie 50 is left in place.

According to one implementation, the guide device is made integrally by molding or 3D printing. Any other production method can be used, for example there may be several parts manufactured separately then fastened together.

This guide system provides multiple advantages. Removing the device once the cables have been installed or positioning the device behind the equipment reduces the risk of foreign object debris (FOD) caused by a device breaking or being left behind in assembly/maintenance operations and subsequently moving around in the equipment and causing damage. The number of operations required to install the cables is reduced. Since the guide device is designed for several different cable diameters, multiple cable standards are not required.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A guide system for a cable tie comprising:
a guide device for the cable tie; and
a supporting element to which the guide device is applied;
wherein the guide device is configured to hold at least one cable on a front face of the supporting element that is oriented towards a cable or cables, an opposite face of the supporting element being a rear face,
wherein the cable tie is configured to traverse the supporting element from the front face to the rear face through a first passage, then again from the rear face to the front face through a second passage to surround the cable or cables, in which the two passages can be separate or a single passage,
wherein the guide device comprises a gutter with a guide surface with two curves, the two curves comprising a first longitudinal curve enabling the surface to extend from one of the passages to another passage and a second transverse curve forming a partial envelope for receiving the cable tie and guiding and holding the cable tie in the gutter,
wherein the gutter comprises a straight elongate portion that is configured to protrude on both sides of the supporting element when the guide device is installed on the supporting element, and
wherein the guide device comprises at least one protrusion with a wedging surface projecting from the surface of the gutter that is configured to come into contact with and wedge against the supporting element to lock the gutter in position in relation to the supporting element.

2. The guide system of claim 1, wherein the gutter has side walls of equal and identical height over at least one portion of a length of the gutter and a single wedging surface.

3. The guide system of claim 2, wherein the wedging surface is configured to be on a side of the front face of the supporting element when the device is in use.

4. A guide method for a cable tie comprising:
providing the guide system of claim 1;
positioning the wedging surface or surfaces against one of the faces of the supporting element; and
guiding the cable tie along an inner surface of the gutter of the guide device, the longitudinal curve enabling the cable tie to traverse the two passages successively and the transverse curve enabling the cable tie to be held transversely inside the gutter while moving.

5. The guide method of claim 4, comprising removing the gutter once the cable tie has traversed the second passage.

6. The guide method of claim 4, comprising fastening the wedging surface or surfaces to the supporting element.

* * * * *